US010019342B2

(12) United States Patent
Sun et al.

(10) Patent No.: US 10,019,342 B2
(45) Date of Patent: Jul. 10, 2018

(54) DATA FLOW PROGRAMMING OF COMPUTING APPARATUS WITH VECTOR ESTIMATION-BASED GRAPH PARTITIONING

(71) Applicant: Intel Corporation, Santa Clara, CA (US)

(72) Inventors: Lawrence J. Sun, Beaverton, OR (US); Vasanth R. Tovinkere, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 158 days.

(21) Appl. No.: 14/998,137

(22) Filed: Dec. 24, 2015

(65) Prior Publication Data

US 2017/0185506 A1 Jun. 29, 2017

(51) Int. Cl.
G06F 9/44 (2018.01)
G06F 11/36 (2006.01)
(52) U.S. Cl.
CPC ...... G06F 11/3636 (2013.01); G06F 11/3692 (2013.01)
(58) Field of Classification Search
None
See application file for complete search history.

(56) References Cited

U.S. PATENT DOCUMENTS

2008/0294686 A1* 11/2008 Long ................. G06F 17/30598
2011/0295903 A1* 12/2011 Chen ................. G06F 17/30598
707/794
2012/0011186 A1 1/2012 Lee et al.
2012/0296619 A1* 11/2012 Maliassov ............... E21B 43/00
703/10

(Continued)

FOREIGN PATENT DOCUMENTS

WO WO2015-068083 5/2015

OTHER PUBLICATIONS

Jiang et al., "Relations Between Adjacency and Modularity Graph Partitioning," May 9, 2015.*

(Continued)

Primary Examiner — Insun Kang
(74) Attorney, Agent, or Firm — Schwabe, Williamson & Wyatt, P.C.

(57) ABSTRACT

In various embodiments, a spectral graph partitioner ("SP") of a graph partitioning system ("GPS") may partition a data flow graph associated with a program into a plurality of subgraphs to be used to perform analysis or debugging. The SP may generate estimated eigenvectors for a matrix representing the graph through minimization of a function on the vectors. The SP may generate multiple eigenvectors to perform the clustering in a multi-dimensional space described by the eigenvectors. The SP may refine the clustering by repeating generation of eigenvectors to describe higher-dimensional spaces and perform further clustering. The SP may also determine quality metrics for the clusters (Continued)

and may stop refinement based on the quality metrics. The GPS may select between utilizing the SP or utilizing one or more other partitioners based on various factors such as, for example, graph size or quality metrics. Other embodiments may be described and/or claimed.

25 Claims, 6 Drawing Sheets

(56) References Cited

U.S. PATENT DOCUMENTS

| | | | |
|---|---|---|---|
| 2013/0268549 | A1 | 10/2013 | Delling et al. |
| 2014/0107921 | A1 | 4/2014 | Delling et al. |
| 2014/0320497 | A1 | 10/2014 | Vojnovic et al. |
| 2015/0067644 | A1 | 3/2015 | Chakraborty et al. |
| 2015/0363361 | A1* | 12/2015 | Kniazev ............. G05B 23/0224 703/2 |
| 2017/0154151 | A1* | 6/2017 | Brunet .................... G06F 19/12 |

OTHER PUBLICATIONS

Urschel et al., Spectral bisection of graphs and connectedness, © 2014 ElsevierInc.*
Qiu et al., "Graph matching and clustering using spectral partitions," 2005, Pattern Recognition Society.*
Vladymyrov, Locally Linear Landmarks for Large-Scale Manifold Learning, 2013.*
Liu, Large-Scale Spectral Clustering on Graphs, 2013.*
Rohe, Spectral Clustering and the High-Dimensional Stochastic Blockmodel, 2011, Institute of Mathematical Statistics.*
Wang et al., A vector partitioning approach to detecting community structure in complex networks, 2007 Elsevier Ltd.*
Lawrence J. Sun, "Technologies for Automatic Partitioning of Large Graphs", U.S. Appl. No. 14/866,190, filed Sep. 25, 2015, 39 pages.
International Search Report and Written Opinion dated Mar. 6, 2017 for International Application No. PCT/US2016/063054, 17 pages.
Charles J. Alpert et al., "Spectral partitioning with multiple eigenvectors",Discrete Applied Mathematics, vol. 90, Issues 1-3, Jan. 15, 1999, pp. 3-26.
Habil Zare et al., "Data reduction for spectral clustering to analyze high throughput flow cytometry data", BMC Bioinformatic.s 2010, 11:403, Jul. 28, 2010, pp. 1-16.
Jialu Liu et al., "Large-Scale Spectral Clustering on Graphs", IJCAI '13 Proceedings of the Twenty-Third international joint conference on Artificial Intelligence, Aug. 3-9, 2013, pp. 1486-1492.
Bouraoui Ouni et al., "Temporal partitioning of data flow graphs for reconfigurable architectures", International Journal of Computational Science and Engineering, vol. 9, Nos. 1/2, 2014, pp. 21-33.
Subhanshu Goyal et al., "A survey on graph partitioning approach to spectral clustering", Journal of Computer Science and Cybernetics, vol. 31, No. 1, Mar. 2015, pp. 31-42.
International Search Report for PCT1US161048595, dated Nov. 28, 2016 (3 pages).
Written Opinion for PCT/US161048595, dated Nov. 28, 2016 ( 5 pages).

* cited by examiner

DATA FLOW PROGRAMMING OF COMPUTING APPARATUS WITH VECTOR ESTIMATION-BASED GRAPH PARTITIONING

TECHNICAL FIELD

The present disclosure relates to the field of data processing, in particular, to apparatuses, methods and storage media associated with data flow programing of computing apparatuses, including automated partitioning of large data flow graphs associated with programs to program the computing apparatuses.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In a data-flow programming paradigm, automated processes may be described in the form of data-flow graphs. To conduct performance analysis of data-flow programs, an associated data-flow graph may be partitioned into smaller, independent subgraphs which may be analyzed individually. Such partitioning may be desired because different partitions of a graph may have different performance characteristics and thus may benefit from different performance solutions. However, determining an optimal graph partitioning is typically a complex process which resists efficient computation, especially as graph sizes increase. Many typical graph partitioning processes do not scale well to large graph sizes.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
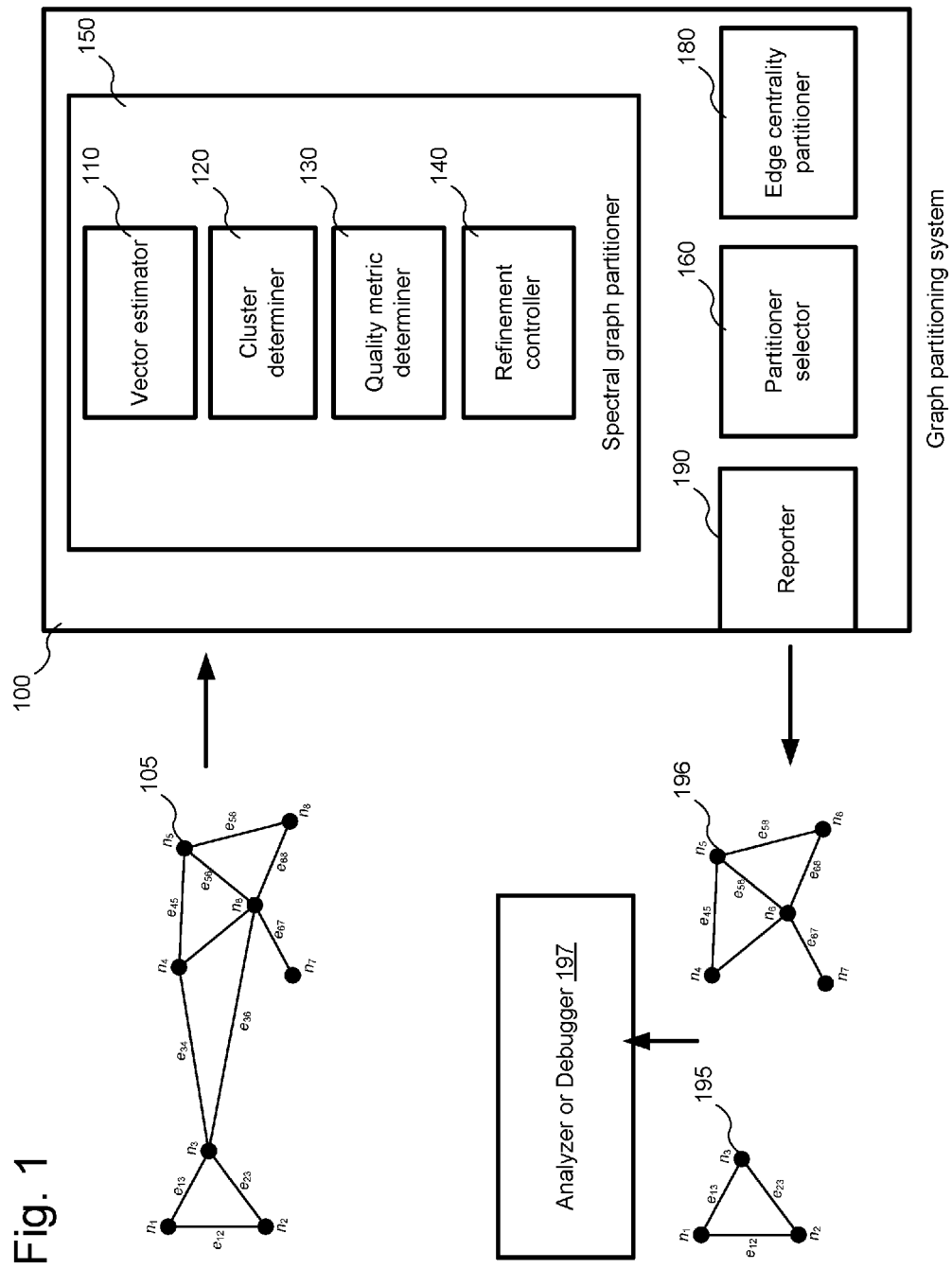
FIG. 1 illustrates example components and information flows of a graph partitioning system including a spectral graph partitioner, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As described herein, the term "logic" and "module" may refer to, be part of, or include a System on a Chip, as described below.

In various embodiments, a spectral graph partitioner ("SP") of a graph partitioning system ("GPS") may be configured to perform an estimation-based partitioning of a data flow graph associated with a program to program a computing apparatus into a plurality of subgraphs. The subgraphs may be used to perform analysis or debugging of the program. After performance of the analysis or debugging of the program, the program may be used to program a computing apparatus to perform a task. The computing apparatus to operate the SP and the computing apparatus to be programmed may be the same or different computing apparatuses. The computing apparatus(es) may be any computing apparatus(es) known in the art including, but art not limited to, computing tablets, laptops, desktops or servers. The task may be any task known in the art, from system service tasks to application tasks.

The SP may be configured to estimate one or more vectors to utilize for partitioning the data flow graph (hereinafter, simply "graph") into a plurality of clusters of nodes to form corresponding subgraphs. The SP may be configured to generate estimated eigenvectors for a Laplacian matrix representing the graph. The SP may be configured to generate the estimated eigenvectors as a vector v through minimization of a function described by $$f = \sum_{i \sim j} (v_i - v_j)^2 + \frac{c}{n}(n - \|v\|^2)^2.$$

In various embodiments, the SP may be configured to set a random coordinate of the vector v to 0 during the minimization of the function $f$. After estimation of the eigenvector, the 0-set coordinate may be re-set to an average of neighboring coordinates.

In various embodiments, the SP may be configured to generate multiple estimated eigenvectors for usage in clustering nodes of the graph into multiple clusters, thus partitioning the graph into multiple subgraphs. The SP may be configured to perform the clustering using k-means clustering in a mutli-dimensional space described by the estimated eigenvectors. In various embodiments, the SP may also be configured to refine the clustering by repeating generation of estimated eigenvectors to describe higher-dimensional spaces, in which further clustering may be performed. The SP may also be configured to determine quality metrics for the clusters and to stop refinement of the clustering based on the quality metrics. In various embodiments, the GPS may also be configured to select between utilizing the partition generated by SP or utilizing one or more other partitioners for partitioning. For example, the GPS may utilize an edge-centrality partitioner for reporting of one or more partitions of the graph instead of the SP. The GPS may select between the SP and the other partitioners based on various factors such as, for example, graph size or quality metrics determined by the SP for one or more clusterings generated by the SP.

Referring now to FIG. 1, components and information flows of a GPS 100 including an SP 150 are shown in accordance with various embodiments. It may be noted that, while particular components are illustrated, in various embodiments, the GPS 100 and/or SP 150 may include other components and/or may omit one or more components illustrated in FIG. 1. In various embodiments, the illustrated components may be implemented in hardware and/or software, and may be configured to operate on computing devices of various form factors, such as described below.

In various embodiments, the GPS 100 may receive a graph associated with a program to program a computing apparatus, such as illustrated example graph 105, to analyze and partition into a plurality of subgraphs, illustrated in FIG. 1 as subgraphs 195 and 196, to facilitate analysis and/or debugging of the program. It may be noted that, while graph 105 is illustrated as being partitioned into two subgraphs, this is done for purposes of illustration; in various embodiments, partitions may include various numbers of subgraphs.

In various embodiments, the graph 105 may include one or more vertices or nodes, illustrated in FIG. 1 as various "nodes $n_i$. The graph 105 may also include one or more edges connecting the nodes, illustrated in FIG. 1 as edges $e_j$. In various embodiments, the GPS 100, and the SP 150 in particular, may be configured to cluster nodes of the graph 105 into multiple clusters such that the numbers of edges which connect clusters are reduced, if not minimized. In various embodiments, the graph 105 may be provided to the GPS 100 in various forms, as may be understood. Also, while the illustrated graph 105 contains only 8 nodes and 11 edges, it may be recognized that, in various embodiments, the graph 105 may be much larger, containing hundreds or thousands of nodes and/or edges, well beyond a human's ability to efficiently partition the graph manually. Generally, a graph with more than a hundred nodes and/or edges is difficult for human to efficiently partition manually.

In various embodiments, the SP 150 may include various components to perform spectral partitioning on the graph 105. For example, the SP 150 may include a vector estimator 110 ("VE 110"), which may be configured to generate one or more estimated vectors, such as estimated eigenvectors, which may aid in partitioning of the graph 105. In various embodiments, the estimated eigenvectors may be estimated eigenvectors for Laplacian matrix which describes the graph 105, as may be understood. Particular descriptions of eigenvectors and Laplacian matrices may be found below. In various embodiments, the VE 110 may be configured to perform eigenvector estimation through determination of a vector whose value minimizes an evaluation function based on the vector. In various embodiments, the VE 110 may be configured to generate multiple estimated eigenvectors to use for a clustering. The VE 110 may also be configured to generate additional estimated eigenvectors in order to refine clustering into greater numbers of subgraphs, such as described below.

In various embodiments, the SP 150 may also include a cluster determiner 120 ("CD 120"). In various embodiments, the CD 120 may be configured to cluster the nodes of graph 105 into multiple clusters based on the estimated eigenvectors generated by the VE 110. In various embodiments, the CD 120 may be configured to represent the nodes of the graph 105 as points in a multi-dimensional space described by the generated estimated eigenvectors. In various embodiments, the CD 120 may be configured to perform a k-means clustering to cluster the nodes of the graph 105 in the multi-dimensional space, as may be understood. In other embodiments, the CD 120 may perform other processes for clustering the nodes of the graph, as may be understood.

In various embodiments, the SP 150 may include a quality metric determiner 130 ("QM 130")which may be configured to determine one or more quality metrics for a clustering determined by the CD 120. In various embodiments, the quality metrics may include modularity metrics and/or cluster path length metrics, as described herein. In various embodiments, other quality metrics may be determined by the QM 130. In various embodiments the SP 150 may include a refinement controller 140 ("RC 140"), which may be configured to control the SP 150 to repeat estimated eigenvector estimation by the VE 110 and cluster determination by the CD 120 for greater numbers of estimated eigenvectors and/or higher numbers of clusters, in order to determine higher-quality partitions. In various embodiments, the RC 140 may be configured to base control of vector estimation and cluster determination on quality metrics determined by the QM 130. For example, the RC 140 may be configured to increase vector and cluster numbers while quality metrics continue to increase. Once quality metrics stop increasing (or fail to increase over one or more thresholds), the RC 140 may cease further partitioning by the SP 150 and its constituent components.

In various embodiments, the GPS 100 may include components which may be used for controlling of partitioning as well as reporting of partitions. In various embodiments, the GPS 100 may include a partitioner selector 160 ("PS 160"), which may be configured to select between a partition made using the SP 150 or partitioning using one or more other partitioning components, such as an edge centrality partitioner 180 ("ECP 180"). In various embodiments, the PS 160 may be configured to select between partitioners based on one or more qualities of the graph 105, such as, for example graph size or complexity. In other embodiments the PS 160 may be configured to select review quality metrics for a clustering provided by the SP 150 and to determine whether the clustering is of sufficient quality to report as a result from the GPS 100. If the clustering is not of sufficient quality, the PS 160 may utilize the ECP 180, or other graph partitioner, to perform a partitioning of the graph 105.

In various embodiments, the ECP 180 may perform one or more edge centrality partitioning processes. In various embodiments, an edge centrality graph partitioning process may compute the edge centralities and delete edges with larger centrality values. This process may be continued until the graph 105 becomes disconnected and the cluster quality metrics may be computed to see if the recent deletion of edges resulted in better cluster quality metrics. If the quality improves, this process may be continued until sufficient partitions have been made. If the quality deteriorates, the deleted edges may be added back to the graph. In various embodiments, the technique performed by the ECP 180 may provide superior quality metrics to that of the SP 150. However, in various embodiments, the ECP 180 may perform its partitioning more slowly than the SP 150 for a given-size graph; this efficiency difference may grow quickly as the size of the input graph grows.

The GPS 100 may also include a reporter 190, which may be configured to report results of the partitioning performed by the SP 150 or other partitioner, for analysis or debugging of the program. In various embodiments, the reporter 190 may be configured to provide the results in various forms, e.g., identification of nodes describing subgraphs 195 and 196. In various embodiments, the reporter may be configured to report the partitioning directly to a storage device to a data structure for subsequent access by an analyzer or debugger 197, and/or to a user, such as via a text report (not shown). Other techniques for reporting of the subgraphs 195 and 196 may be understood.

Figure 2:
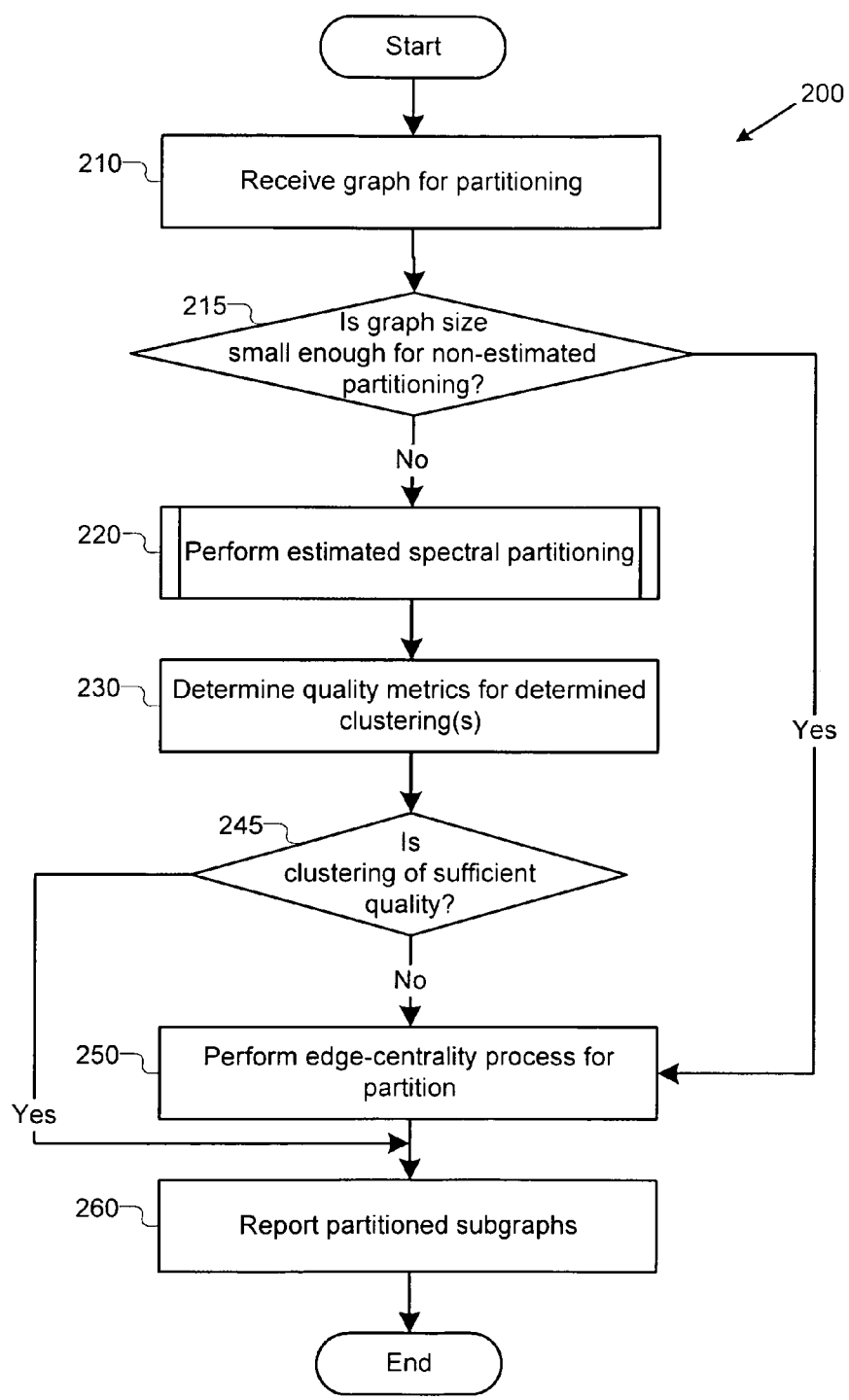
FIG. 2 illustrates an example process for the graph partitioning system to partition a graph, in accordance with various embodiments.

Referring now to FIG. 2, an example process 200 for the GPS 100 to partition a graph is illustrated in accordance with various embodiments. While FIG. 2 illustrates particular operations in a particular order, in various embodiments the operations may be combined, split into parts, and/or omitted. In various embodiments, the GPS 100, may perform the process of FIG. 2 in order to selection which partitioner to use to partition an input graph, as well as to perform the partitioning itself.

The process may begin at decision operation 210, where the GPS 100 may receive a graph 105 for partitioning. In various embodiments, the graph 105 may include indications or records of one or more nodes as well as one or more edges connecting the nodes. In various embodiments, the graph 105 may be a directional or a nondirectional graph, and may or may not include edge weights. In various embodiments, the GPS 100 may be configured to convert directional graphs to nondirectional graphs. Next, at decision operation 215, the PS 160 may determine whether the size of the graph is sufficiently small that a non-estimated partitioning technique, such as that performed by the ECP 180, may be performed without incurring undesirable processing time. For example, the PS 160 may select the ECP 180 for partitioning if the size of the graph is below 100 nodes. In various embodiments, if the graph is sufficiently small, then the process may then proceed to operation 250, where the ECP 180 may perform an edge-centrality process for partitioning the graph 105 into subgraphs (e.g., subgraphs 195 and 196). The process may then proceed to operation 260, where the subgraphs may be reported by the GPS 100. It may be noted that, in other embodiments, the PS 160 may be configured to analyze other qualities of the graph 105, such as graph connectedness or other graph metrics, rather than, or in addition to, analyzing the size of the graph.

If, however, at decision operation 215 the PS 160 determines that the graph 105 is too large for non-estimated partitioning (or that estimated partitioning is applicable for some other reason), then at operation 220, the SP 150 may perform an estimated spectral partitioning on the graph 105 to determine one or more clusterings of nodes in graph 105. Particular embodiments of the process of operation 220 may be described below with reference to process 300 of FIG. 3.

Next, at operation 230, the QM 130 may determine quality metrics for the clusterings. In some embodiments, the quality metrics may be determined by the QM 130 in the course of the SP 150 partitioning the graph 105. In other embodiments, the quality metrics may be determined for one or more partitions generated by the SP 150 after the SP 150 partitions the graph 105. In various embodiments, the GPS 100 may include a quality metric determiner other than the QM 130 for such determination.

In various embodiments, the quality metrics may include various metrics indicating characteristics of a current clustering within the graph 105, such as connectedness, compactness, or other characteristics. For example, in various embodiments at operation 230 the QM 130 may compute a modularity metric Q for the clustering. The QM 130 may compute the modularity metric Q using Equation (1), as shown below. To calculate Q, QM 130 may construct a k×k matrix e, where k is the number of clusters or partitions found in the graph 105. Each element $e_{ij}$ of e may be the fraction of all edges in the graph 105 that link nodes in the cluster i to vertices in the cluster j. The values of the matrix e may be determined based on the original graph 105. The row sums $a_i$ may be defined as $a_i = \Sigma_j e_{ij}$, and represent fractions of edges that connect to nodes in the cluster i. As shown in Equation (1), the modularity measure Q may equal the trace of the matrix e minus the sum of the elements of the matrix $e^2$. Values of Q close to zero may indicate that the number of within-cluster edges is no better than would be expected with random connections between vertices, and thus may indicate poor clustering. Values of Q close to one, which is the maximum value, may indicate good clustering.

$$Q = \sum_i (e_{ii} - a_i^2) = Tre - \|e^2\| \qquad (1)$$

In some embodiments, at operation 230, the QM 130 may calculate a modified cluster path length metric for the clustering. The modified cluster path metric calculated by the QM 130 may maximize at reasonable cluster numbers and sizes for large graphs and peaks for similar clusterings as compared to the modularity metric Q. Similar to the modularity metric Q, higher values of the modified cluster length metric may indicate better clustering. As shown in Equation (2), the modified cluster path length M may be equal to a plus component $M^+$ minus four times a minus component $M^-$.

$$M = M^+ - 4M^- \qquad (2)$$

The plus component $M^+$ may be calculated as shown in Equation (3). The term $n_i$ of Equation 3 may represent the number of nodes in a cluster i, and the term n represents the number of nodes in the graph 105. Thus, the plus component $M^+$ may equal the sum of average distance between nodes in the graph 105 over the average distance between nodes in each cluster, weighted by the relative number of nodes in each cluster.

$$M^+ = \frac{1}{n}\sum_{i=1}^{k} \frac{n_i \cdot \text{Average Distance Between Nodes in Graph}}{\text{Average Distance Between Nodes in Cluster } i} \quad (3)$$

The minus component M⁻ may be calculated as shown in Equation (4). As shown, the minus component M⁻ may include edge density, which may be calculated as shown in Equation (5). The edge density may represent the ratio of the number of edges in the graph 105 in relation to the maximum potential number of edges that could be included in the graph 105. Including the edge density in the minus component M⁻ may prevent over-clustering for sparse graphs 105.

$$M^- = \frac{1}{k(k-1)} \sum_{\substack{i,j=1 \\ i \neq j}}^{k} \frac{\text{Edges Between Clusters } i, j}{n_i \cdot n_j \cdot \text{Edge Density}} \quad (4)$$

$$\text{Edge Density} = \frac{\text{Numbers of Edges}}{n(n-1)} \quad (5)$$

Next, at decision operation 245, the SP 150 may review the determined quality metrics to determine whether the clustering is of sufficient quality. In various embodiments, the SP 150 may compare the determined quality metrics to one or more thresholds to perform the determination of decision operation 245. In various embodiments, the SP 150 may determine that the clustering is of sufficient quality if the value of Q is above .3, and/or if the value of M is large positive integer. If, at decision operation 245, the SP 150 determines that the clustering is not of sufficient quality, then at operation 250 the ECP 180 may perform an edge-centrality process for partitioning the graph 105 into subgraphs (e.g., subgraphs 195 and 196). Regardless, at operation 260 the subgraphs determined by the SP 150 or the ECP 190 may be reported by the GPS 100.

Figure 3:
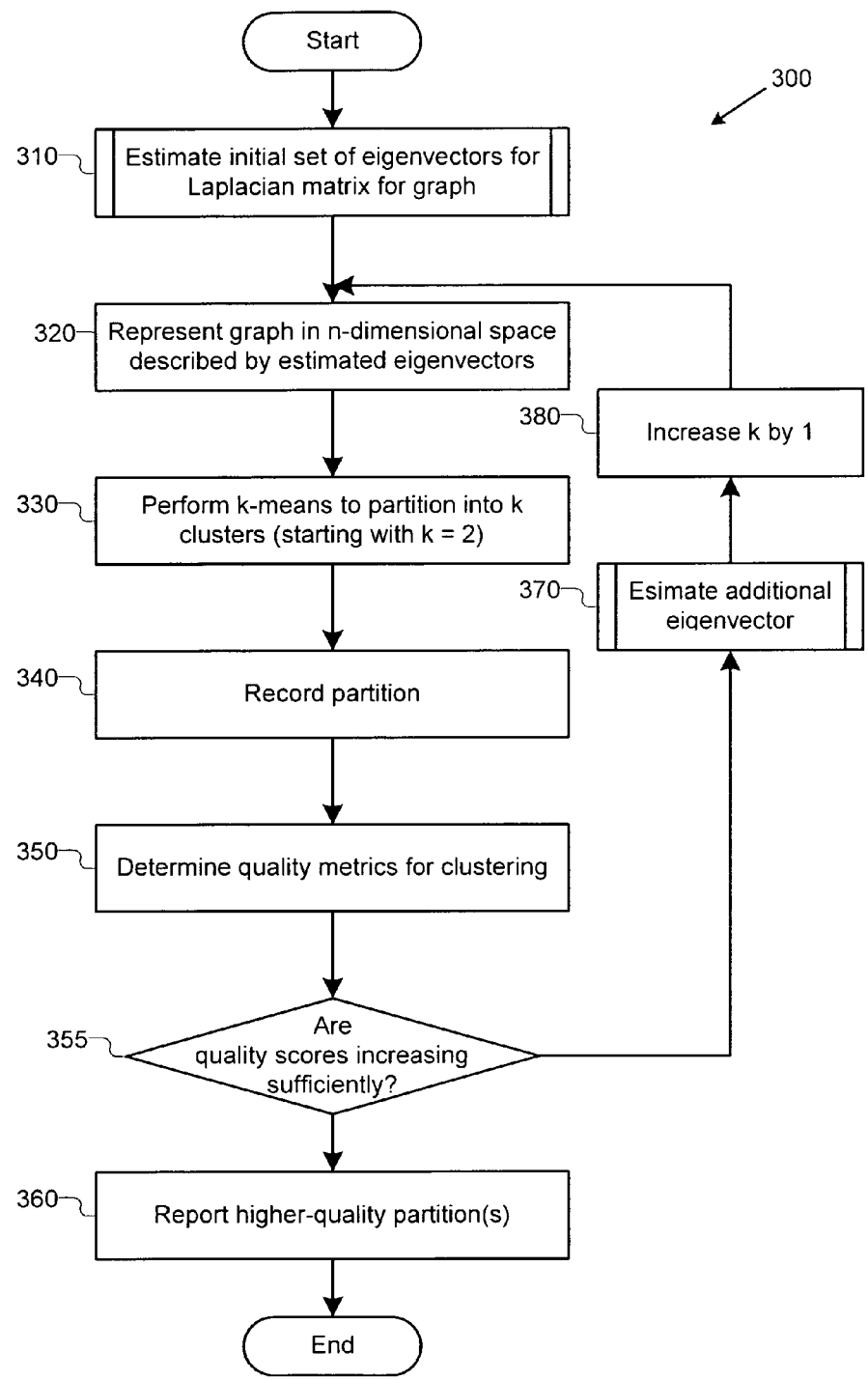
FIG. 3 illustrates an example process for the spectral graph partitioner to perform a spectral partitioning of a graph, in accordance with various embodiments.

Referring now to FIG. 3, an example process 300 for the SP 150 to perform a spectral partitioning of the graph 105 is illustrated in accordance with various embodiments. In various embodiments, process 300 may be performed to implement, in whole or in part, operation 220 of process 200 of FIG. 2. While FIG. 3 illustrates particular operations in a particular order, in various embodiments the operations may be combined, split into parts, and/or omitted. The process may begin at operation 310, where the VE 110 may approximate an initial set of eigenvectors for the graph 105. Particular embodiments of the process of operation 310 may be described below with reference to process 400 of FIG. 4. In various embodiments, operation 310 may be repeated to form an initial set of five estimated eigenvectors for the graph 105. However, in other embodiments initial sets of other sizes may be utilized.

Figure 4:
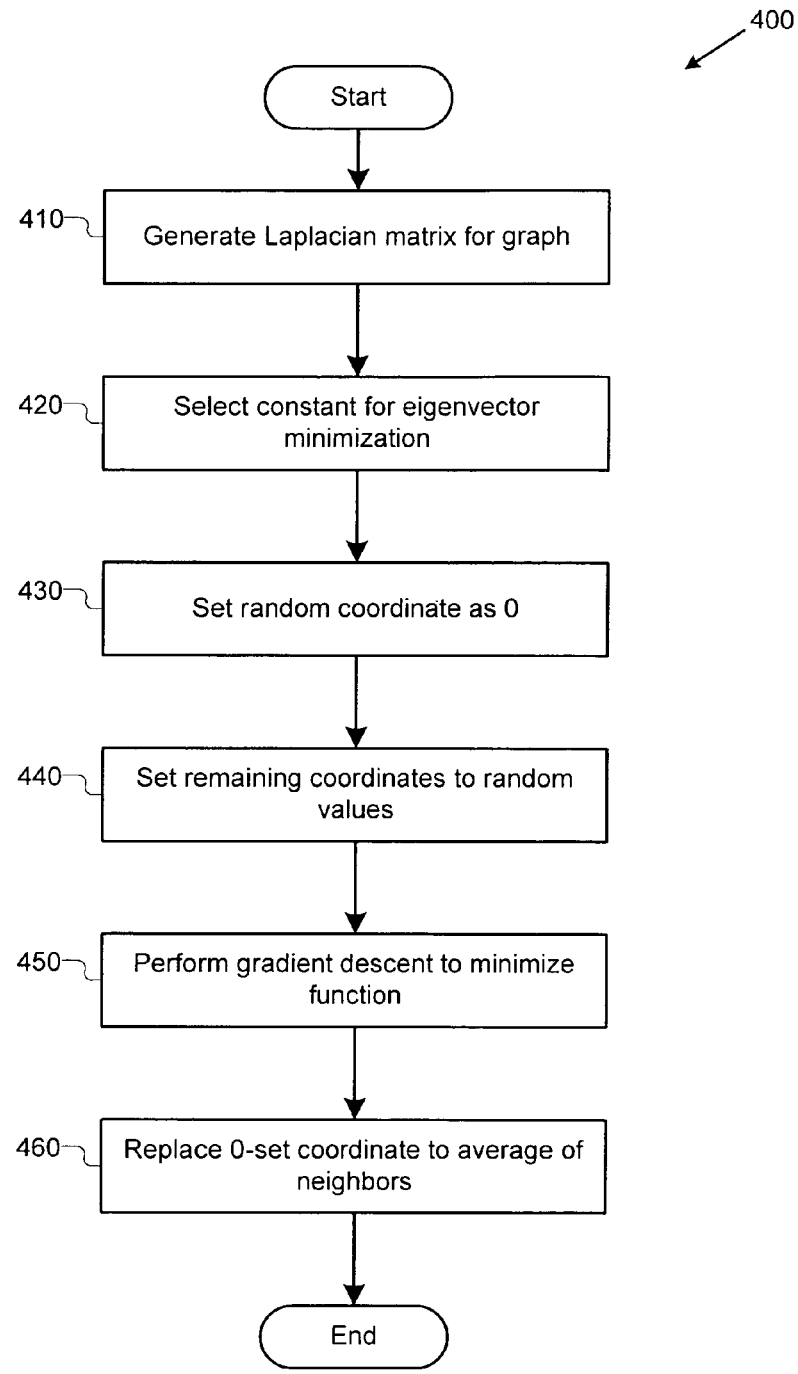
FIG. 4 illustrates an example process for estimating an eigenvector for a graph, in accordance with various embodiments.

Referring now to FIG. 4, an example process for an example process 400 for estimating an eigenvector for a graph is illustrated in accordance with various embodiments. In various embodiments, process 400 may be performed to implement, in whole or in part, operation 310 of process 300 of FIG. 3. While FIG. 4 illustrates particular operations in a particular order, in various embodiments the operations may be combined, split into parts, and/or omitted. The process may begin at operation 410, where the VE 110 may generate a Laplacian matrix for the graph 105. In various embodiments, a Laplacian matrix for the graph 105 may include a matrix defined according to the nodes and edges of graph 105, by the following Definition (6):

$$L_{i,j} := \begin{cases} \deg(n_i) & \text{if } i = j \\ -1 & \text{if } i \neq j \text{ and } n_i \text{ is adjacent to } n_j . \\ 0 & \text{otherwise} \end{cases} \quad (6)$$

In various embodiments, operations 420-460 may be performed with reference to Equation (7), below. In various embodiments, the VE 110 may be configured to set up and minimize the function of Equation (7) over the course of operations 420-460:

$$f = \sum_{i \sim j} (v_i - v_j)^2 + \frac{c}{n}(n - \|v\|^2)^2 \quad (7)$$

where n is the number of nodes in the graph 105, $v_i$ is the ith coordinate of v, c is a constant, and the summation is made over all coordinates $v_i$ and $v_j$ where nodes i and j are connected by an edge in the graph (denoted as "i~j"). In various embodiments, by minimizing the value of $f$ in Equation (7), a vector v may be obtained that may be used to provide an estimated eigenvector for the Laplacian matrix of operation 410. It may be noted that, in various embodiments, the last term of Equation (7), e.g., (n−∥v∥²), may be squared in order to force the square of the magnitude of v to be near n (with the 1/n factor added for normalization). Next, at operation 420, the VE 110 may select a constant c for usage in Equation (7). In some embodiments, at operation 420, c may be selected to be a value roughly equal to the inverse of the degree of the graph 105.

Next, at operation 430, the VE 110 may select a random coordinate of v and set the coordinate to 0. In various embodiments, the VE 110 may set the coordinate to 0 in order to avoid the estimation process leading to a trivial small eigenvector. Next, at operation, 440, the VE 110 may set the remaining coordinates of v to random values. At operation 450, the VE 110 may then perform a gradient descent on the function of Equation (7) to minimize the $f$. In various embodiments, techniques for performing gradient descents may be understood. In other embodiments, other techniques for minimizing the function $f$ may be utilized. After operation 450, at operation 460, the VE 110 may then replace the coordinate set to 0 at operation 430 with a new value. In various embodiments, the 0-set coordinate may be set to an average of its neighbors. For example, if the ith coordinate $v_o$ of v was set to 0 at operation 430, then $v_i$ may be set to the average of $v_{i-1}$ and $v_{i+1}$. After completion of operation 460 v may be utilized as an estimated eigenvector for the Laplacian matrix for graph 105. The process may then end.

Returning now to FIG. 3, at operation 320, the CD 120 may represent nodes of the graph in an n-dimensional space described by the estimated eigenvectors generated by the VE 110 at operation 310. For example, if, at operation 310, 5 eigenvectors were estimated, then at operation 320, the graph may be represented in a 5-space described by these eigenvectors. In various embodiments, techniques for representing the nodes in the n-dimensional space may be known. Next, at operation 330, a k-means clustering may be performed to partition the represented nodes of the graph into k clusters such that nodes are identified into clusters with the nearest mean, as may be understood. In various embodiments, the first time such a clustering occurs at operation 330, k may be set to 2, to determine two clusters. However, in other embodiments, different numbers of clusters may be determined.

Next, at operation 340, the clustering obtained at operation 330 may be recorded, and at operation 350 quality metrics for the clustering may be determined by the QM 130. In various embodiments, the QM 130 may determine the Q and/or M metrics as described above. Next, at decision operation 355, the RC 140 may determine whether the quality metrics determined at operation 350 are still sufficiently increasing relative to previously determined metrics. In various embodiments, at decision operation 355, the amount of increase of one or more quality metrics (if any) may be compared to thresholds to determine if the amount of increase is sufficient for further refinement.

If the quality metrics are sufficiently increasing, then it may be determined that the clustering may improve from further refinement and the process may proceed to operation 370, where an additional eigenvector may be estimated by the VE 110. Similarly to operation 310, particular embodiments of the process of operation 370 may be described below with reference to process 400 of FIG. 4. Next, at operation 380, the CD 120 may increase the value of k by 1 to cause the CD 120 to partition the graph 105 into a larger number of clusters on the next iteration. The process may then return to operation 320 for determination of a new clustering for the new value of k. If, however, at decision operation 355 it is determined that the quality metrics are not increasing sufficiently, then at operation 360, the CD 120 may report one or more clusters which have higher quality metrics out of those that have been recorded as the resulting partition. The process may then end.

Figure 5:
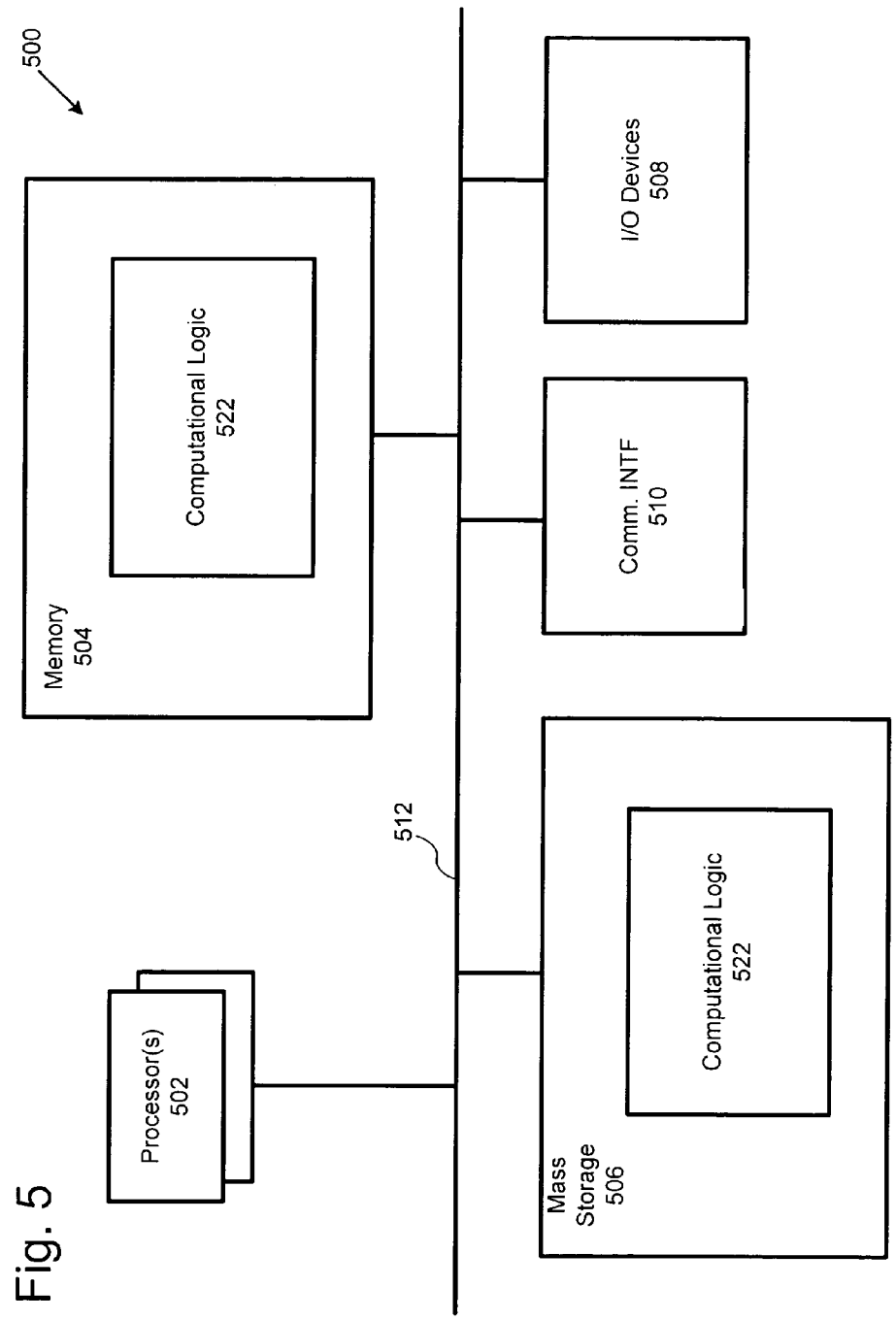
FIG. 5 illustrates an example computing environment suitable for practicing various aspects of the present disclosure, in accordance with various embodiments.

Referring now to FIG. 5, an example computer suitable for practicing various aspects of the present disclosure, including processes of FIGS. 2-4, is illustrated in accordance with various embodiments. As shown, computer 500 may include one or more processors or processor cores 502, and system memory 504. For the purpose of this application, including the claims, the terms "processor" and "processor cores" may be considered synonymous, unless the context clearly requires otherwise. Additionally, computer 500 may include mass storage devices 506 (such as diskette, hard drive, compact disc read only memory (CD-ROM) and so forth), input/output devices 508 (such as display, keyboard, cursor control, remote control, gaming controller, image capture device, and so forth) and communication interfaces 510 (such as network interface cards, modems, infrared receivers, radio transceivers (e.g., Bluetooth, Wi-Fi, Near Field Communications, Radio-frequency identification, and so forth). The elements may be coupled to each other via system bus 512, which may represent one or more buses. In the case of multiple buses, they may be bridged by one or more bus bridges (not shown).

Each of these elements may perform its conventional functions known in the art. In particular, system memory 504 and mass storage devices 506 may be employed to store a working copy and a permanent copy of the programming instructions implementing one or more of the operations associated with the partitioning techniques described with references to FIGS. 2-4, such as SP 150, PS 160, ECP 180 and/or reporter 190, collectively referred to as computing logic 522. The various elements may be implemented by assembler instructions supported by processor(s) 502 or high-level languages, such as, for example, C, that can be compiled into such instructions. In various embodiments, the system memory 504 or mass storage 506 may include various memory implementations, including integrated flash memory, such as in a System on a Chip, a USB flash drive, SD Card, on SATA SSD, etc.

The permanent copy of the programming instructions may be placed into permanent storage devices 506 in the factory, or in the field, through, for example, a distribution medium (not shown), such as a compact disc (CD), or through communication interface 510 (from a distribution server (not shown)). In embodiments, the programming instructions may be stored in one or more computer readable non-transitory storage media. In other embodiments, the programming instructions may be encoded in transitory storage media, such as signals.

The number, capability and/or capacity of these elements 510-512 may vary. Their constitutions are otherwise known, and accordingly will not be further described.

Figure 6:
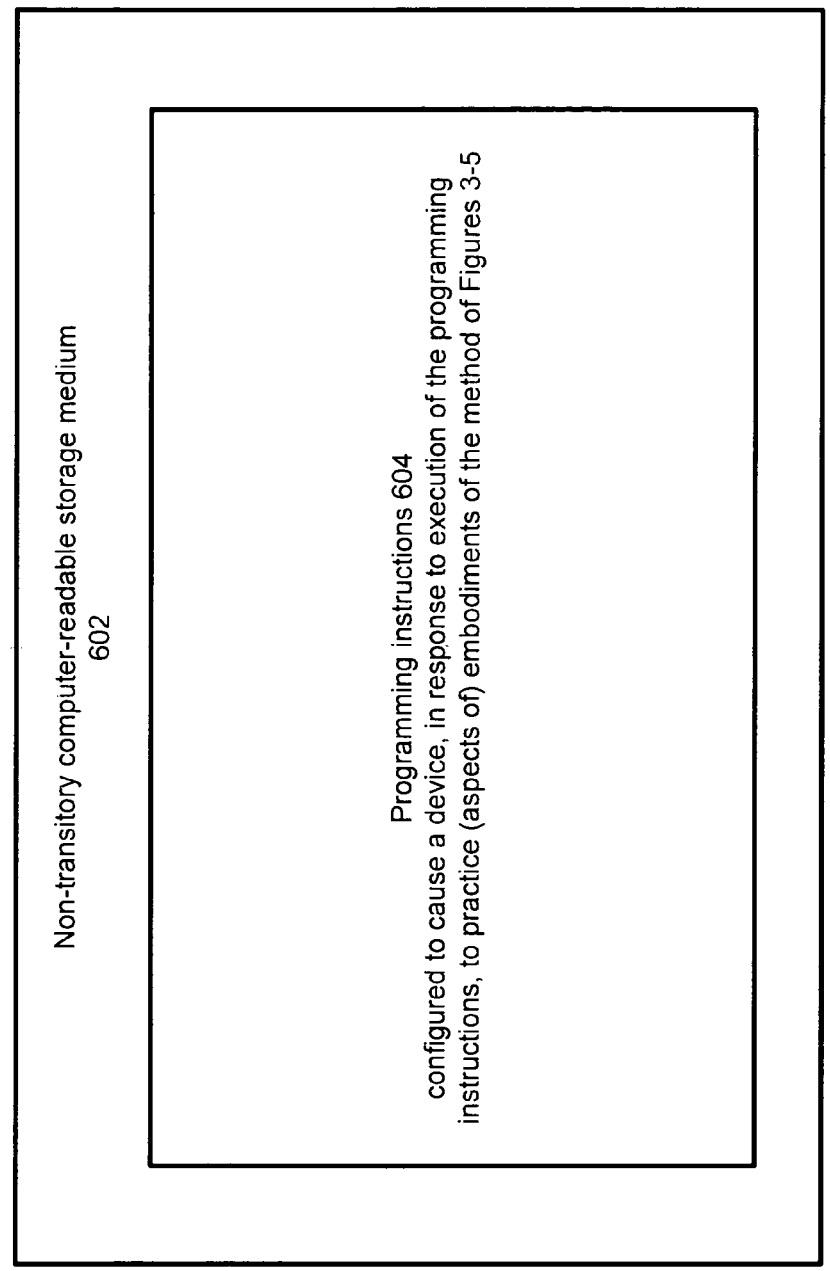
FIG. 6 illustrates an example storage medium with instructions configured to enable an apparatus to practice various aspects of the present disclosure, in accordance with various embodiments.

FIG. 6 illustrates an example least one computer-readable storage medium 602 having instructions configured to practice all or selected ones of the operations associated with the techniques earlier described, in accordance with various embodiments. As illustrated, least one computer-readable storage medium 602 may include a number of programming instructions 604. Programming instructions 604 may be configured to enable a device, e.g., computer 500, in response to execution of the programming instructions, to perform, e.g., various operations of processes of the figures described above, e.g., but not limited to, to the various operations performed to perform partitioning techniques described herein In alternate embodiments, programming instructions 604 may be disposed on multiple least one computer-readable storage media 602 instead.

Referring back to FIG. 5, for one embodiment, at least one of processors 502 may be packaged together with a memory having computational logic 522 configured to practice aspects of processes of FIGS. 2-4. For one embodiment, at least one of processors 502 may be packaged together with a memory having computational logic 522 configured to practice aspects of processes of FIGS. 2-4 to form a System in Package (SiP). For one embodiment, at least one of processors 502 may be integrated on the same die with a memory having computational logic 522 configured to practice aspects of processes of FIGS. 2-4. For one embodiment, at least one of processors 502 may be packaged together with a memory having computational logic 522 configured to practice aspects of processes of FIGS. 2-4 to form a System on Chip (SoC). For at least one embodiment, the SoC may be utilized in, e.g., but not limited to, a computing tablet. (e.g., Wi-Fi, Blue Tooth, Blue Tooth Low Energy, Near Field Communications, Radio-frequency identification (RFID), etc.) and other components as necessary to meet functional and non-functional requirements of the system.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 may include a computing apparatus equipped to support data flow programming. The computing apparatus may include one or more computing processors and a spectral graph partitioner to operate on the one or more computing processors to partition a data flow graph associated with a program into a plurality of subgraphs. The spectral graph petitioner may include a vector estimator to generate one or more estimated vectors to partition the graph into the plurality of subgraphs. The spectral graph petitioner may also include a cluster determiner to define a multi-dimensional space based on the plurality of estimated vectors and cluster nodes of the graph to form the plurality of subgraphs in the multi-dimensional space. The plurality of subgraphs may be used in analysis or debugging of the program and the program may be used to program the computing apparatus or another computing apparatus to perform a task.

Example 2 may include the computing apparatus of example 1, wherein the vector estimator may be to generate the one or more estimated vectors through generation of eigenvectors for a Laplacian matrix describing the graph.

Example 3 may include the computing apparatus of example 2, wherein the vector estimator may be to generate an eigenvector as a vector v through minimization of a function described by $$f = \sum_{i \sim j} (v_i - v_j)^2 + \frac{c}{n}(n - \|v\|^2)^2,$$

where n may be a number of vertices in the graph and c may be a constant.

Example 4 may include the computing apparatus of example 3, wherein minimization of the function may include performance of a gradient descent on the function $f$.

Example 5 may include the computing apparatus of example 3, wherein a value of the constant c may be based at least in part on and inverse of a degree of the graph.

Example 6 may include the computing apparatus of example 3, wherein generate eigenvectors may include set one coordinate of the vector v to 0 prior to minimization of the function $f$.

Example 7 may include the computing apparatus of example 6, wherein generate eigenvectors may include set, after minimization of the function $f$, the coordinate which had been set to 0 to an average of its coordinate neighbors.

Example 8 may include the computing apparatus of any of examples 1-7, wherein the cluster determiner may be to cluster the nodes of the graph to form the plurality of subgraphs through performance of a k-means clustering process.

Example 9 may include the computing apparatus of any of examples 1-8, wherein the spectral graph partitioner further may include a quality metric determiner to determine, given a clustering of nodes of the graph, one or more quality metrics for the clustering of the nodes.

Example 10 may include the computing apparatus of example 9, wherein the quality metric determiner may be to determine a modularity metric for the clustering of the nodes.

Example 11 may include the computing apparatus of example 9, wherein the quality metric determiner may be to determine a cluster path length metric for the clustering of the nodes.

Example 12 may include the computing apparatus of example 9, wherein the spectral graph partitioner further may include a refinement controller to cause repetition of the generation of estimated vectors and the clustering of nodes of the graph based at least in part on the one or more quality metrics.

Example 13 may include the computing apparatus of example 12, wherein the refinement controller may be to cause the nodes of the graph to be clustered into an increased numbers of clusters as additional estimated vectors may be generated.

Example 14 may include the computing apparatus of any of examples 1-13, and may further include a partitioner selector to select between utilizing the spectral graph partitioner or one or more other graph partitioners of the apparatus.

Example 15 may include the apparatus of example 14, wherein the partitioner selector may be to select based at least in part on a size of the graph.

Example 16 may include the apparatus of example 14, wherein the partitioner selector may be to select based at least in part on one or more quality metrics determined for one or more clusterings generated by the spectral partitioner.

Example 17 may include the apparatus of example 14, wherein the partitioner selector may be to select between the spectral partitioner and an edge centrality partitioner.

Example 18 may include a computer-implemented method for supporting data flow programming. The method may include receiving, by a computing system, a data flow graph associated with a program; generating, by the computing system, one or more estimated vectors to partition the graph into a plurality of subgraphs; defining, by the computing system, a multi-dimensional space based on the plurality of estimated vectors; and clustering, by the computing system, nodes of the graph to form the plurality of subgraphs in the multi-dimensional space. The plurality of subgraphs may be used in analysis or debugging of the program and the program may be used to program the computing system or another computing system to perform a task.

Example 19 may include the method of example 18, wherein generating the one or more estimated vectors may include generating eigenvectors for a Laplacian matrix describing the graph.

Example 20 may include the method of example 19, wherein generating eigenvectors may include generating an eigenvector as a vector v through minimizing a function described by $$f = \sum_{i \sim j} (v_i - v_j)^2 + \frac{c}{n}(n - \|v\|^2)^2,$$

where n may be a number of vertices in the graph and c may be a constant.

Example 21 may include the method of example 20, wherein minimizing the function may include performing a gradient descent on the function $f$.

Example 22 may include the method of example 20, and may further include the computing system utilizing a value of the constant c based at least in part on and inverse of a degree of the graph.

Example 23 may include the method of example 20, wherein generating eigenvectors may include setting one coordinate of the vector v to 0 prior to minimization of the function $f$.

Example 24 may include the method of example 23, wherein generating eigenvectors may include setting, after minimization of the function $f$, the coordinate which had been set to 0 to an average of its coordinate neighbors.

Example 25 may include the method of any of examples 18-24, wherein clustering the nodes of the graph to form the plurality of subgraphs may include performing a k-means clustering process.

Example 26 may include the method of any of examples 18-25, and may further include determining, by the computing system, given a clustering of nodes of the graph, one or more quality metrics for the clustering of the nodes.

Example 27 may include the method of example 26, wherein determining one or more quality metrics may include determining a modularity metric for the clustering of the nodes.

Example 28 may include the method of example 26, wherein determining one or more quality metrics may include determining a cluster path length metric for the clustering of the nodes.

Example 29 may include the method of example 26, and may further include causing, by the computing system, repetition of the generation of estimated vectors and the clustering of nodes of the graph based at least in part on the one or more quality metrics.

Example 30 may include the method of example 29, and may further include causing, by the computing system, the nodes of the graph to be clustered into an increased numbers of clusters as additional estimated vectors may be generated.

Example 31 may include the method of any of examples 18-30, and may further include selecting, by the computing system, between utilizing the spectral graph partitioner or one or more other graph partitioners of the apparatus.

Example 32 may include the method of example 31, wherein selecting may include selecting based at least in part on a size of the graph.

Example 33 may include the method of example 31, wherein selecting may include selecting based at least in part on one or more quality metrics determined for one or more clusterings generated by the spectral partitioner.

Example 34 may include the method of example 31, wherein selecting may include selecting between a spectral partitioning process and an edge centrality partitioning process.

Example 35 may include one or more computer-readable media containing instructions written thereon that, in response to execution on a computing system, cause the computing system to support data flow programming. The instructions may cause the computing system to: receive a data flow graph associated with a program, generate one or more estimated vectors to partition the graph into a plurality of subgraphs, define a multi-dimensional space based on the plurality of estimated vectors, and cluster nodes of the graph to form the plurality of subgraphs in the multi-dimensional space. The plurality of subgraphs may be used in analysis or debugging of the program and the program may be used to program the computing system or another computing system to perform a task.

Example 36 may include the computer-readable media of example 35, wherein generate the one or more estimated vectors may include generate eigenvectors for a Laplacian matrix describing the graph.

Example 37 may include the computer-readable media of example 36, wherein generate eigenvectors may include generate an eigenvector as a vector v through minimizing a function described by $$f = \sum_{i \sim j} (v_i - v_j)^2 + \frac{c}{n}(n - \|v\|^2)^2,$$

where n may be a number of vertices in the graph and c may be a constant.

Example 38 may include the computer-readable media of example 37, wherein minimize the function may include perform a gradient descent on the function $f$.

Example 39 may include the computer-readable media of example 37, wherein the instructions may be further to cause the computing system to utilizing a value of the constant c based at least in part on and inverse of a degree of the graph.

Example 40 may include the computer-readable media of example 37, wherein generate eigenvectors may include set one coordinate of the vector v to 0 prior to minimization of the function $f$.

Example 41 may include the computer-readable media of example 40, wherein generate eigenvectors may include set, after minimization of the function $f$, the coordinate which had been set to 0 to an average of its coordinate neighbors.

Example 42 may include the computer-readable media of any of examples 35-41, wherein cluster the nodes of the graph to form the plurality of subgraphs may include perform a k-means clustering process.

Example 43 may include the computer-readable media of any of examples 35-42, wherein the instructions may be further to cause the computing system to determine, given a clustering of nodes of the graph, one or more quality metrics for the clustering of the nodes.

Example 44 may include the computer-readable media of example 43, wherein determine one or more quality metrics may include determine a modularity metric for the clustering of the nodes.

Example 45 may include the computer-readable media of example 43, wherein determine one or more quality metrics may include determine a cluster path length metric for the clustering of the nodes.

Example 46 may include the computer-readable media of example 43, wherein the instructions may be further to cause the computing system to repeat the generation of estimated vectors and the clustering of nodes of the graph based at least in part on the one or more quality metrics.

Example 47 may include the computer-readable media of example 46, wherein the instructions may be further to cause the computing system to cluster the nodes of the graph into an increased numbers of clusters as additional estimated vectors may be generated.

Example 48 may include the computer-readable media of any of examples 35-47, wherein the instructions may be further to cause the computing system to select between utilizing the spectral graph partitioner or one or more other graph partitioners of the apparatus.

Example 49 may include the computer-readable media of example 48, wherein select may include select based at least in part on a size of the graph.

Example 50 may include the computer-readable media of example 48, wherein select may include select based at least in part on one or more quality metrics determined for one or more clusterings generated by the spectral partitioner.

Example 51 may include the computer-readable media of example 48, wherein select may include select between a spectral partitioning process and an edge centrality partitioning process.

Example 52 may include a computing apparatus for supporting data flow programming. The apparatus may include: means for receiving a data flow graph associated with a program; means for generating one or more estimated vectors to partition the graph into a plurality of subgraphs; means for defining a multi-dimensional space based on the plurality of estimated vectors; and means for clustering nodes of the graph to form the plurality of subgraphs in the multi-dimensional space. The plurality of subgraphs may be used in analysis or debugging of the program and the program may be used to program the computing apparatus or another computing apparatus to perform a task.

Example 53 may include the computing apparatus of example 52, wherein means for generating the one or more estimated vectors may include means for generating eigenvectors for a Laplacian matrix describing the graph.

Example 54 may include the computing apparatus of example 53, wherein means for generating eigenvectors may include means for generating an eigenvector as a vector v through minimizing a function described by $$f = \sum_{i \sim j} (v_i - v_j)^2 + \frac{c}{n}(n - \|v\|^2)^2,$$

where n may be a number of vertices in the graph and c may be a constant.

Example 55 may include the computing apparatus of example 54, wherein means for minimizing the function may include means for performing a gradient descent on the function f.

Example 56 may include the computing apparatus of example 54, wherein the means for minimizing the function utilize a value of the constant c based at least in part on and inverse of a degree of the graph.

Example 57 may include the computing apparatus of example 54, wherein means for generating eigenvectors may include means for setting one coordinate of the vector v to 0 prior to minimization of the function f.

Example 58 may include the computing apparatus of example 57, wherein means for generating eigenvectors may include means for setting, after minimization of the function f, the coordinate which had been set to 0 to an average of its coordinate neighbors.

Example 59 may include the computing apparatus of any of examples 52-58, wherein means for clustering the nodes of the graph to form the plurality of subgraphs may include means for performing a k-means clustering process.

Example 60 may include the computing apparatus of any of examples 52-59, and may further include means for determining, given a clustering of nodes of the graph, one or more quality metrics for the clustering of the nodes.

Example 61 may include the computing apparatus of example 60, wherein means for determining one or more quality metrics may include means for determining a modularity metric for the clustering of the nodes.

Example 62 may include the computing apparatus of example 60, wherein means for determining one or more quality metrics may include means for determining a cluster path length metric for the clustering of the nodes.

Example 63 may include the computing apparatus of example 60, and may further include means for causing repetition of the generation of estimated vectors and the clustering of nodes of the graph based at least in part on the one or more quality metrics.

Example 64 may include the computing apparatus of example 63, and may further include means for causing the nodes of the graph to be clustered into an increased numbers of clusters as additional estimated vectors may be generated.

Example 65 may include the computing apparatus of any of examples 52-64, and may further include means for selecting between utilizing the spectral graph partitioner or one or more other graph partitioners of the apparatus.

Example 66 may include the computing apparatus of example 65, wherein means for selecting may include means for selecting based at least in part on a size of the graph.

Example 67 may include the computing apparatus of example 65, wherein means for selecting may include means for selecting based at least in part on one or more quality metrics determined for one or more clusterings generated by the spectral partitioner.

Example 68 may include the computing apparatus of example 65, wherein means for selecting may include means for selecting between a spectral partitioning process and an edge centrality partitioning process.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A computing apparatus for analyzing or debugging a data flow program, comprising:
   one or more computing hardware processors;
   a spectral graph partitioner to execute on the one or more computing hardware processors to partition a data flow graph associated with the data flow program into a plurality of subgraphs and output results of the partition, wherein the data flow program operates on the one or more computing hardware processors or other one or more computing hardware processors of another computing apparatus;
   wherein the spectral graph partitioner includes:
      a vector estimator to generate one or more estimated vectors for a matrix describing the graph through minimization of a function on the vectors to partition the graph into the plurality of subgraphs; and
      a cluster determiner to:
         define a multi-dimensional space based on the one or more estimated vectors; and
         cluster nodes of the graph to form the plurality of subgraphs in the multi-dimensional space;
   an analyzer or debugger to execute on the one or more computing hardware processors to analyze or debug the data flow program using the plurality of subgraphs in the multi-dimensional space formed from the clustering; and
   wherein to generate the one or more estimated vectors, the vector estimator generates at least a vector v using a function that depends on at least differences between a plurality of coordinates of the vector v or a difference between a number of nodes in the graph and a magnitude of the vector v.

2. The computing apparatus of claim 1, wherein to generate the one or more estimated vectors, the vector estimator generates the one or more estimated vectors through generation of eigenvectors for a Laplacian matrix describing the graph, where the vector v is an eigenvector for the Laplacian matrix describing the graph.

3. The computing apparatus of claim 2, wherein to generate the one or more estimated vectors, the vector estimator generates the vector v through the minimization of the function described by $$f = \sum_{i \sim j} (v_i - v_j)^2 + \frac{c}{n}(n - \|v\|^2)^2,$$

where n is a number of nodes in the graph, $v_i$ and $v_j$ are coordinates of the vector v, $\|v\|$ is the magnitude of the vector v, and c is a constant.

4. The computing apparatus of claim 3, wherein the minimization of the function comprises performance of a gradient descent on the function $f$.

5. The computing apparatus of claim 3, wherein a value of the constant c is based at least in part on an inverse of a degree of the graph.

6. The computing apparatus of claim 3, wherein the generation of the vector v comprises:
 setting one coordinate of the vector v to 0 prior to the minimization of the function $f$; and
 setting, after the minimization of the function $f$, the coordinate which had been set to 0 to an average of its coordinate neighbors.

7. The computing apparatus of claim 1, wherein the cluster determiner clusters the nodes of the graph to form the plurality of subgraphs through performance of a k-means clustering process.

8. The computing apparatus of claim 1, wherein the spectral graph partitioner further comprises a quality metric determiner to determine, given the clustering of the nodes of the graph, one or more quality metrics for the clustering of the nodes.

9. The computing apparatus of claim 8, wherein the quality metric determiner determines one or more of a modularity metric or a cluster path length metric for the clustering of the nodes.

10. The computing apparatus of claim 8, wherein the spectral graph partitioner further comprises a refinement controller to cause repetition of the generation of estimated vectors and the clustering of the nodes of the graph based at least in part on the one or more quality metrics.

11. The computing apparatus of claim 10, wherein the refinement controller causes the nodes of the graph to be clustered into increased numbers of clusters as additional estimated vectors are generated.

12. The computing apparatus of claim 1, further comprising a partitioner selector to select between utilizing the spectral graph partitioner or one or more other graph partitioners of an apparatus.

13. The computing apparatus of claim 12, wherein the partitioner selector selects based at least in part on a size of the graph or on one or more quality metrics determined for one or more clusterings generated by the spectral graph partitioner.

14. The computing apparatus of claim 12, wherein the partitioner selector selects between the spectral graph partitioner and an edge centrality partitioner.

15. A computer-implemented method for analyzing or debugging a data flow program, comprising:
 receiving, by a computing system, a data flow graph associated with the data flown program, the data flow program being operated on the computing system or another computing system;
 generating, by the computing system, one or more estimated vectors for a matrix describing the graph through minimization of a function on the vectors to partition the graph into a plurality of subgraphs;
 defining, by the computing system, a multi-dimensional space based on one or more estimated vectors;
 clustering, by the computing system, nodes of the graph to form the plurality of subgraphs in the multi-dimensional space; and
 executing, by the computing system, an analyzer or debugger to analyze or debug the data flow program, using the plurality of subgraphs in the multi-dimensional space formed by the clustering;
 wherein the generating of the one or more estimated vectors comprises generating at least a vector v using a function that depends on at least differences between a plurality of coordinates of the vector v or a difference between a number of nodes in the graph and a magnitude of the vector v.

16. The method of claim 15, wherein the generating of the one or more estimated vectors comprises generating eigenvectors for a Laplacian matrix describing the graph; and wherein to generate the eigenvectors, generating a vector v through minimizing the function described by $$f = \sum_{i \sim j} (v_i - v_j)^2 + \frac{c}{n}(n - \|v\|^2)^2,$$

where n is a number of nodes in the graph, $v_i$ and $v_j$ are coordinates of the vector v, $\|v\|$ is the magnitude of the vector v, and c is a constant.

17. The method of claim 15, further comprising determining, by the computing system, given the clustering of the nodes of the graph, one or more quality metrics for the clustering of the nodes.

18. The method of claim 17, wherein the determining of one or more quality metrics comprises determining one or more of a modularity metric or a cluster path length metric for the clustering of the nodes.

19. The method of claim 17, further comprising causing, by the computing system, repetition of the generation of estimated vectors and the clustering of the nodes of the graph based at least in part on the one or more quality metrics.

20. One or more non-transitory computer-readable media containing instructions written thereon that, in response to execution on a computing system, cause the computing system to:
 receive a data flow graph associated with a data flow program that operates on the computing system or another computing system;
 generate one or more estimated vectors for a matrix describing the graph through minimization of a function on the vectors to partition the graph into a plurality of subgraphs;
 define a multi-dimensional space based on the one or more estimated vectors;
 cluster nodes of the graph to form the plurality of subgraphs in the multi-dimensional space; and
 execute an analyzer or debugger to analyze or debug the data flow program, using the plurality of subgraphs in the multi-dimensional space formed from the clustering;

wherein to generate the one or more estimated vectors comprises to generate at least a vector v using a function that depends on at least differences between a plurality of coordinates of the vector v or a difference between a number of nodes in the graph and a magnitude of the vector v.

21. The non-transitory computer-readable media of claim 20, wherein generating the one or more estimated vectors comprises generating eigenvectors for a Laplacian matrix describing the graph; and wherein generating eigenvectors comprises generating a vector v through minimizing the function described by $$f = \sum_{i \sim j} (v_i - v_j)^2 + \frac{c}{n}(n - \|v\|^2)^2,$$

where n is a number of nodes in the graph, $v_i$ and $v_j$ are coordinates of the vector v, $\|v\|$ is the magnitude of the vector v, and c is a constant.

22. The non-transitory computer-readable media of claim 20, wherein the instructions are further to cause the computing system to determine, given the clustering of the nodes of the graph, one or more quality metrics for the clustering of the nodes.

23. The non-transitory computer-readable media of claim 22, wherein determining the one or more quality metrics comprises determining one or more of a modularity metric or a cluster path length metric for the clustering of the nodes.

24. The non-transitory computer-readable media of claim 22, wherein the instructions are further to cause the computing system to repeat the generation of the estimated vectors and the clustering of the nodes of the graph based at least in part on the one or more quality metrics.

25. The non-transitory computer-readable media of claim 20, wherein the instructions are further to cause the computing system to select between utilizing a spectral graph partitioner or one or more other graph partitioners of the computing system.

* * * * *